United States Patent Office 2,955,803
Patented Oct. 11, 1960

2,955,803

METHOD OF DEFOLIATING PLANTS

Lewis Edward Goyette, Richmond, Va., assignor to Virginia-Carolina Chemical Corporation, Richmond, Va., a corporation of Virginia No Drawing. Filed June 9, 1958, Ser. No. 740,545

10 Claims. (Cl. 71—2.3)

This invention is concerned with a method of defoliating plants by using organic compounds containing sulfur and trivalent phosphorus as defoliating agents. This application is a continuation-in-part of my copending application Serial No. 574,069, filed March 27, 1956. In said copending application I disclose a method of defoliating cotton by applying to the leaves of the cotton plants a trialkyl-phosphorotrithioite in which the alkyl group contains from 1 to 6 carbon atoms.

I have now discovered that in addition to defoliating cotton, the trialkyl phosphorotrithioites are useful for defoliation of other plants. I have further found that there are other organic compounds containing sulfur and trivalent phosphorus, phosphorotrithioites, which are also excellent defoliants, and that there are other organic compounds containing sulfur, trivalent phosphorus, and oxygen, phosphorodithioites and phosphoromonothioites, that are also excellent defoliants. By organic compounds I mean compounds which in addition to the above named elements also contain hydrocarbon chains and/or hydrocarbon rings and may contain other groups substituted in the hydrocarbon chain or hydrocarbon ring.

Any substance which can duplicate the effect of a light frost on a plant is commonly called a defoliating agent. The effect of the application of such a material is equivalent to a light frost causing the formation of abscission layers of cells across the petiole bases of the leaves of the plants. The result is a premature leaf drop.

By far the largest use at present for defoliants is in the defoliation of cotton plants. However, there is also interest in defoliants for such plants as roses, hydrangeas, many types of fruit and shade trees, and for other field grown crops such as soybeans. Because of the wide interest in and use of defoliants for cotton the majority of my work has been with cotton; however, I have found that the compounds useful in my method of defoliating cotton are also useful in defoliating other plants, and my invention is concerned with a method of defoliating all types of plants which normally have an annual leaf-drop. However, as stated above, most of my work has been primarily concerned with cotton.

On normal cotton plants which are not treated with defoliating agents, the bolls on the lower branches open first while the bolls on the upper branches continue to open slowly over a period of as long as two months from the time when picking of the lower bolls is desirable. The majority of the leaves remain attached to the plant and cause green stains on the cotton when mechanical cotton pickers are employed. In addition, the leaves high on the plant shade the lower bolls from sunlight and air resulting in excessive boll rot. At times, 15% of the cotton crop has been lost because of this boll rot. Without the use of defoliating agents, numerous hand pickings are necessary to prevent boll rot and staining.

I have discovered that the foliage of cotton plants can be treated with many types of phosphorothioite compounds with the result that the leaves are shed and the bolls open uniformly. Thus, the entire crop may be machine harvested at one time and also at an earlier date than normal because of the quick loss of leaves. By phosphorothioite compounds, I mean compounds as previously described which contain trivalent phosphorus and sulfur, and in some instances, oxygen.

The amount of defoliant to be applied will depend upon the kind of vegetation to be defoliated and the density thereof, as well as the choice of defoliant compound. As is illustrated in the following examples, emulsions containing as little as 0.03% by weight of the active ingredients have been used effectively. My compounds have been found to be effective when applied to normal cotton stands at rates varying from 1.00 to 10 lbs. per acre, but it is to be understood that these figures do not represent either maximum or minimum limits.

The defoliant is applied to cotton usually when the bolls are from 35 to 40 days old, but this may vary with the season and climate.

Improved, very efficient defoliant compositions are obtained when oil-in-water emulsions of solutions of my compounds in oil are prepared. The word "oil" is used here to designate any liquid which is a solvent for the phosphorothioites of my invention and is insoluble in water, such as xylene, kerosene, diesel oil, benzene, carbon tetrachloride, ether, heptane, heavy mineral oils, and water insoluble solutions of water-soluble liquids in water-insoluble liquids such as a solution of ethyl alcohol in kerosene. The emulsions may be obtained by first dissolving the phosphorothioite in the oil and then mixing the resulting solution with water in the presence of an emulsifying agent. In actual commercial sale and application, the defoliant compounds are dissolved in the oil solvent and the emulsifier is added to the solution. In the field this mixture of active ingredient, oil and emulsifier is mixed with water before actual application to the cotton plant. Any of the many methods of spray application may be employed.

Emulsifying agents customarily used in the art for the preparation of oil-in-water emulsions are operable in the practice of my invention, e.g., ionic or non-ionic emulsifying or dispersing agents such as the long-chain alkyl-benzene-sulfonates or polyglycol ethers. Such emulsifying agents are normally employed in only very small concentrations, for example, in a quantity up to about 0.3% by weight based on the weight of the emulsion. However, it is possible to use any amount of emulsifying agent up to a quantity which would be detrimental to the cotton plant. Some emulsifiers show phytotoxic reactions when used on living plants. Concentrations of emulsifier up to about 5% by weight do not normally damage healthy cotton plants. Such emulsifiers do not affect the chemical stability or defoliating activity of the phosphorothioites.

While the compounds of my invention are advantageously used as defoliants when formulated into oil-in-water emulsions, they may also be dissolved in organic solvents or so-called oils as mentioned above, and such solutions applied directly onto the cotton plants. In formulations such as the latter a wetting agent is sometimes required. They may also be mixed with solid carriers such as clay, talc, pumice, and bentonite and then dusted onto the cotton plants. The compounds may also be mixed and applied with liquid or solid agricultural pesticides such as insecticides and/or fungicides. While all of these methods of application are operable, the oil-in-water emulsions and the solutions of the compounds in oil are preferred. The emulsions tend to adhere easily to the plant foliage and are very readily applied by conventional spray methods. The preferred methods of application require less of the active ingredient to give comparable defoliant efficiency than do any of the other methods of application referred to above.

An important feature of my defoliant compositions is that they give more uniformly acceptable results under the various climatic conditions which exist in the individual States located across the cotton belt of the United States. This is illustrated below in Example IV, which shows two of the phosphorothioite compounds that give excellent defoliation over the range of environment from South Carolina to California.

While the defoliants are of greatest value when the cotton crop is to be picked mechanically, they are also useful if the cotton is to be hand picked. The bolls open uniformly and with the leaves gone more cotton can be harvested with one picking.

In the foregoing paragraphs, the uses and methods of application of defoliants on cotton have been discussed. However, as will be seen in some of the following tables and examples, the compounds of my invention are also useful as defoliants on a number of other plants such as roses, hydrangeas, and plum, peach, Siberian elm, pear, sand cherry, and ash trees.

As was previously stated, the compounds of utility in my invention are phosphorothioites, and are defined by the following generic formulas:

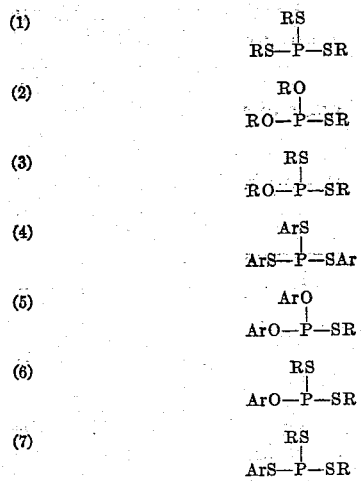

where R is hydrogen or a lower-alkyl or substituted lower-alkyl group, and Ar is an aryl or substituted aryl group.

The upper limit of the size of the alkyl group in Formulas 1, 2, 3, 5, 6, and 7 has not been determined, but there is good reason to believe that compounds in which the alkyl group contains up to 6 carbon atoms will be found to be effective defoliants, although some variation in effectiveness is to be expected. From the data in the following tables, it will be seen that the effectiveness may reach a maximum at say 3 or 4 carbon atoms and then decrease. However, there does not appear to be any critical or sharply defined upper limit to the number of carbon atoms in the alkyl group.

There are known methods for the preparation of some of these compounds. Others, however, are believed to be new, and methods for their preparation are illustrated in Examples I, II, and III, following.

A general method for the preparation of trialkyl phosphorotrithioites (Formula 1, above) is disclosed in U.S. Patent No. 2,682,554. Triethyl, tripropyl, and tributyl homologs were reported by Lippert and Reid, J. Am. Chem. Soc., 60, 2370 (1938). These authors also summarized known methods for the preparation of these compounds.

Some of the compounds falling under Formulas 2 and 3, above, which are trialkyl phosphoromonothioites and trialkyl phosphorodithioites, respectively, have also been prepared previously and are disclosed in Kosolapoff, Organophosphorus Compounds, John Wiley and Sons, Inc., 1950, page 206. Further reference is made to Arbuzov and Nikonorov, Doklady Akad. Nauk, S.S.S.R., 62, 75 (1948).

One of the compounds of Formula 4 is also disclosed in the Kosolapoff reference, and a method of preparation is discussed by Tasker and Jones, J. Chem. Soc., 95, 1910 (1909).

In all of the following examples, parts and percentages are by weight, unless otherwise indicated.

EXAMPLE I

*Preparation of S-butyl O,O-diphenyl phosphorothioite, Formula 5*

$$PCl_3 + 2C_6H_5OH \rightarrow (C_6H_5O)_2PCl + 2HCl$$

$$(C_6H_5O)_2PCl + C_4H_9SH + (C_2H_5)_3N \rightarrow$$
$$(C_6H_5O)_2PSC_4H_9 + (C_2H_5)_3N \cdot HCl$$

686.7 parts of $PCl_3$ (40% excess) were placed in a 4-neck flask fitted with a large addition funnel, stirrer, thermometer, and reflux condenser consisting of a Dewar condenser placed on top of a conventional water-cooled condenser. The vapor take-off from the Dewar condenser was connected to a water aspirator and a manometer, with a bleed to the atmosphere so that a partial vacuum could be maintained in the reaction vessel. 564.7 parts of phenol were added through the addition funnel over a 30-minute period while the reaction mixture was subjected to constant agitation, and while a partial vacuum was maintained in the reaction vessel to withdraw HCl vapors. Considerable foaming and a temperature decrease in the reaction vessel indicated that HCl was being evolved. After phenol addition was completed, a heating mantle was applied to the reaction vessel and the temperature was slowly increased to 90° C. over a 6-hour period. The reaction mixture was allowed to stand overnight and then vacuum distilled. The fraction boiling at 118–121° C. at 0.4 mm. pressure was collected as diphenyl phosphorochloridite, and approximately 265 parts were obtained.

90 parts of butyl mercaptan, 100 parts of triethyl amine, and 879 parts of benzene were placed in a 4-neck flask fitted with an addition funnel, stirrer, reflux condenser, and thermometer. 191.9 parts of the diphenyl phosphorochloridite prepared above were added through the addition funnel over a 30-minute period while the reaction mixture was subjected to constant agitation, and while the temperature was maintained with an ice bath below 25° C. After chloridite addition was completed, the ice bath was removed and the reaction mixture was stirred for one hour at room temperature and allowed to stand overnight. Then the mixture was stirred for four more hours, filtered, and the filtrate was stripped of solvent and excess amine and mercaptan. The stripped product was flash distilled under vacuum and the fraction boiling at 163°–171° C. at 0.10 mm. pressure was collected as S-butyl O,O-diphenyl phosphorothioite. Approximately 128 parts of the product were obtained.

$n_d^{23} = 1.5736$
$d_4^{20} = 1.155$
Percent P: calculated=10.11; found=9.81
Percent S: calculated=10.47; found=10.70

EXAMPLE II

*Preparation of O-4-biphenylyl S,S-dipropyl phosphorodithioite, Formula 6*

$$PCl_3 + p\text{-}C_6H_5C_6H_4OH \rightarrow 4\text{-}C_6H_5C_6H_4OPCl_2 + HCl$$

$$4\text{-}C_6H_5C_6H_4OPCl_2 + 2C_3H_7SH + 2(C_2H_5)_3N \rightarrow$$
$$4\text{-}C_6H_5C_6H_4OP(SC_3H_7)_2 + 2(C_2H_5)_3N \cdot HCl$$

686.7 parts of $PCl_3$ were placed in a 4-neck flask fitted with a large addition funnel, stirrer, thermometer, and reflux condenser consisting of a Dewar condenser placed on top of a conventional water-cooled condenser. 850.9 parts of p-phenylphenol (80% excess) were added through the addition funnel over a 15-minute period while the reaction mixture was subjected to constant agitation, with only a slight decrease in temperature. After phenylphenol addition was completed, a heating mantle was applied and the temperature was slowly increased to 120° C. over a 6-hour period. The mixture was allowed to stand overnight, and then refluxed for 6 hours at approximately 160° C. Two parts of metallic magnesium catalyst were added, and the mixture was refluxed intermittently for 16 more hours at 152°–166° C. The reaction mixture was stripped of HCl and excess $PCl_3$ for 3 hours at 35° C. under full aspirator vacuum. The stripped product was vacuum distilled, and 527 parts of 4-biphenylyl phosphorodichloridite were obtained.

100 parts of propyl mercaptan, 150 parts of triethyl amine, and 879 parts of benzene were placed in a 4-neck flask fitted with an addition funnel, stirrer, reflux condenser, and thermometer. 135.5 parts of the 4-biphenyl phosphorodichloridite prepared above were added through the addition funnel over a 30-minute period, while the reaction mixture was subjected to constant agitation, and while the temperature was maintained with an ice bath below 20° C. After dichloridite addition was completed, the ice bath was removed and the reaction mixture was stirred for 4.5 hours at room temperature and allowed to stand overnight. The mixture was filtered, and the filtrate stripped with a water aspirator and vacuum pump. Approximately 162.5 parts of O-4-biphenylyl S,S-dipropyl phosphorodithioite were obtained.

$n_d^{22}=1.6101$
$d_4^{20}=1.122$
Percent P: calculated=8.84; found=9.01
Percent S: calculated=18.30; found=18.02

EXAMPLE III

*Preparation of dibutyl tolyl phosphorotrithioite Formula 7*

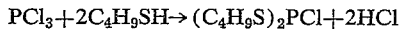
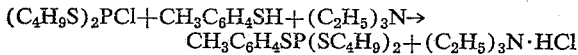

$PCl_3+2C_4H_9SH \rightarrow (C_4H_9S)_2PCl+2HCl$ $(C_4H_9S)_2PCl+CH_3C_6H_4SH+(C_2H_5)_3N \rightarrow$
$\qquad CH_3C_6H_4SP(SC_4H_9)_2+(C_2H_5)_3N \cdot HCl$ 2748 parts of $PCl_3$ (100% excess) were placed in a 4-neck flask fitted with a large addition funnel, stirrer, thermometer, and Dry-Ice reflux condenser. 1804 parts of butyl mercaptan were added through the addition funnel over a period of 2 hours and 40 minutes while the reaction mixture was subjected to constant agitation, and while the temperature was maintained at 25°–35° C. After mercaptan addition was completed, the reaction mixture was allowed to stand overnight. The mixture was then stirred for one hour, heated at 60°–70° C. for 2 hours and 50 minutes, and stirred for 2 more hours at 25 mm. pressure to remove HCl and excess $PCl_3$. The product was distilled, and the fraction boiling at 100°–127° C. at 0.14–0.17 mm. pressure was collected as S,S-dibutyl phosphorodithiochloridite.

62.1 parts of mixed thiocresols, 100 parts of triethylamine, and 879 parts of benzene were placed in a 4-neck flask fitted with an addition funnel, stirrer, reflux condenser, and thermometer. 122.4 parts of the S,S-dibutyl phosphorodithiochloridite prepared above were added through the addition funnel over a 15-minute period while the reaction mixture was subjected to constant agitation, and while the temperature was maintained below 20° C. with an ice bath. After dithiochloridite addition was completed, the ice bath was removed and the reaction mixture was stirred for 6 hours at room temperature and allowed to stand overnight. Then the mixture was stirred for one more hour, filtered, and the filtrate was stripped of solvent and excess amine with a water aspirator and vacuum pump. The stripped product was flash distilled under vacuum, and the fraction boiling at 150°–167° C. at 0.10 mm. pressure was collected as dibutyl tolyl phosphorotrithioite. Approximately 170 parts of the crude product were obtained.

$n_d^{23}=1.5741$
$d_4^{20}=1.045$
Percent P: calculated=9.31; found=9.39
Percent S: calculated=28.93; found=29.58

The active ingredients for my defoliant compositions may be prepared by any of the methods referenced or described above. The appropriate alcohol, phenol, mercaptan or thiophenol need only be substituted into the reactions shown or referenced above.

The following tables and examples summarize the defoliation activity of my compounds on cotton and other plants. Two standard test methods, the cotyledon test and the greenhouse spray test, were employed to determine defoliant activity on cotton, and these are described below.

*Cotyledon test.*—Approximately 30 days after planting, the test chemicals are applied to the cotyledons. By this time, the first and second true leaves have attained full size and the third and fourth are unfolding and expanding.

The chemicals are applied by dipping the cotyledons in a solution containing 500 p.p.m. of the compound. The solution is prepared by dissolving a weighed portion of the test chemical in a small amount of a mixture of Atlox 3335 (25%) and xylene (75%). The emulsifier, Atlox 3335, is a commercial product, which comprises a mixture of alkyl aryl sulfonate blended with polyoxyethylene sorbitan esters of mixed fatty and resin acids. This emulsifiable concentrate is diluted with water to give the 500 p.p.m. concentration.

The amount of abscission is determined at 4 and 6 days following application, and is expressed as percent abscissed of the original number of cotyledons tested.

*Greenhouse spray test.*—Cotton plants approximately 2–3 months old are chosen for treatment. By this time, the plants have obtained maximum growth before stunting due to pot size occurs.

The test chemicals are applied by spraying the plants with solutions containing 500, 1000, 1250, 2000, 2500, and/or 5000 p.p.m. of the compound. The solutions are prepared by dissolving a weighed portion of the compound in a small amount of a mixture of Atlox 3335 (25%) and xylene (75%). These emulsifiable concentrates are then diluted with water to give the required concentrations.

The results are taken 7 days after treatment. The number of leaves which drop is compared with the total number of leaves originally on the plant to give a percent defoliation rating.

Since the above described tests were performed on the compounds in the tables below in the greenhouse during the winter, erratic results were often obtained. Wide variations in temperature, amount of sunlight, and other conditions necessitated the use of a control with which the activity of the test compounds could be compared. Therefore, in Tables I, II, and III, the results are based on one of my compounds, tributyl phosphorotrithioite, which had previously been thoroughly evaluated and field tested. By this I mean that the amount of defoliation shown by tributyl phosphorotrithioite in the cotyledon and spray tests was set equal to 100% and all the other compounds were rated in comparison to it. Complete field test results on tributyl phosphorotrithioite showing its defoliant activity, are given in Example IV and Table V.

Table I includes data on the defoliant activity of my phosphorothioite compounds, as determined by the above described cotyledon test. This test is normally employed as a preliminary evaluation, and compounds showing defoliation comparable to the known control are retested in the greenhouse spray test.

TABLE I.—COTYLEDON TEST RESULTS

| Generic Formula | Structural Formula | Percent Abscission, 500 p.p.m., Based on Tributyl Phosphorotrithioite | |
|---|---|---|---|
| | | 4 Days | 6 Days |
| P(SR)₃, Formula (1) | $P(SCH_2C_6H_5)_3$ | 0 | 20 |
| | $P[SCH_2CH(CH_3)_2]_3$ | 100 | 125 |
| | $P(SC_3H_7)_2(SC_4H_9)_2$ | 125 | 100 |
| (RO)₂PSR, Formula (2) | $(ClCH_2CH_2O)_2PSC_4H_9$ | 133 | 100 |
| | $(C_2H_5O)_2PSC_4H_9$ | 80 | 80 |
| | $HOP(SC_4H_9)_2$ | 175 | 78 |
| | $CH_3OP(SC_4H_9)_2$ | 25 | 25 |
| | $C_2H_5OP(SC_2H_5)_2$ | 0 | 30 |
| | $ClCH_2CH_2OP(SC_3H_7)_2$ | 100 | 80 |
| | $C_2H_5OP(SC_4H_9)_2$ | 100 | 100 |
| | $ClCH_2CH_2OP(SC_4H_9)_2$ | 17 | 90 |
| | $C_3H_7OP(SCH_3)_2$ | 17 | 40 |
| ROP(SR)₂, Formula (3) | $C_3H_7OP(SC_3H_7)_2$ | 0 | 20 |
| | $C_3H_7OP(SC_4H_9)_2$ | 0 | 78 |
| | $ClC_3H_6OP(SC_4H_9)_2$ | 29 | 50 |
| | $C_4H_9OP(SC_3H_7)_2$ | 100 | 89 |
| | $C_4H_9OP(SC_4H_9)_2$ | 0 | 89 |
| | $CH_3CH_2CH(CH_3)OP(SC_4H_9)_2$ | 14 | 90 |
| | $(CH_3)_2CHCH_2OP(SC_4H_9)_2$ | 71 | 90 |
| P(SAr)₃, Formula (4) | $P(SC_6H_4CH_3)_3$ | 12 | 60 |
| | $P(SC_6H_3CH_3CH_3)_3$ | 25 | 11 |
| (ArO)₂PSR, Formula (5) | $(C_6H_5O)_2PSC_3H_7$ | 20 | 60 |
| | $(C_6H_5O)_2PSC_4H_9$ | 30 | 100 |
| | $C_6H_5OP(SC_3H_7)_2$ | 30 | 100 |
| | $C_6H_5OP(SC_4H_9)_2$ | 0 | 180 |
| | $C_6H_5OP(SC_3H_7)(SC_4H_9)$ | 50 | 89 |
| | $Cl_5C_6OP(SC_4H_9)_2$ | 150 | 112 |
| | $p\text{-}ClC_6H_4OP(SC_3H_7)_2$ | 0 | 100 |
| | $p\text{-}ClC_6H_4OP(SC_4H_9)_2$ | 33 | 90 |
| | $4,6\text{-}Cl_2C_6H_3OP(SC_3H_7)_2$ | 25 | 12 |
| | $4,6\text{-}Cl_2C_6H_3OP(SC_4H_9)_2$ | 0 | 25 |
| | $2,4,5\text{-}Cl_3C_6H_2OP(SC_3H_7)_2$ | 0 | 80 |
| | $p\text{-}NO_2C_6H_4OP(SC_4H_9)_2$ | 112 | 90 |
| | $p\text{-}CH_3C_6H_4OP(SC_2H_5)_2$ | 0 | 10 |
| ArOP(SR)₂, Formula (6) | $o\text{-}CH_3C_6H_4OP(SC_4H_9)_2$ | 125 | 111 |
| | $m\text{-}CH_3C_6H_4OP(SC_4H_9)_2$ | 50 | 67 |
| | $p\text{-}CH_3C_6H_4OP(SC_4H_9)_2$ | 0 | 50 |
| | $o\text{-}CH_3C_6H_4OP(SC_3H_7)(SC_4H_9)$ | 25 | 33 |
| | $m\text{-}CH_3C_6H_4OP(SC_3H_7)(SC_4H_9)$ | 50 | 44 |
| | $p\text{-}CH_3C_6H_4OP(SC_3H_7)(SC_4H_9)$ | 200 | 100 |
| | $2,6\text{-}(CH_3CHCH_3)_2C_6H_3OP(SC_4H_9)_2$ | 75 | 100 |
| | $p\text{-}(CH_3)_3CC_6H_4OP(SC_4H_9)_2$ | 67 | 100 |
| | $p\text{-}C_8H_{17}C_6H_4OP(SC_4H_9)_2$ | 0 | 40 |
| | $C_6H_5C_6H_4OP(SC_3H_7)_2$ | 50 | 50 |
| | $C_6H_5C_6H_4OP(SC_4H_9)_2$ | 50 | 38 |
| | $C_6H_5SP(SC_4H_9)_2$ | — | 180 |
| ArSP(SR)₂, Formula (7) | $CH_3C_6H_4SP(SC_4H_9)_2$ | 88 | 100 |
| | $CH_3CH_3C_6H_3SP(SC_4H_9)_2$ | 100 | 100 |

Table II shows the results of the preliminary greenhouse spray test on the most promising compounds in Table I. In this second screening, the threshold concentration of 500 p.p.m. is used, and the compounds which show good activity at this low concentration are retested at a wide range of concentrations.

TABLE II.—GREENHOUSE SPRAY TEST—SCREENING RESULTS

| Generic Formula | Structural Formula | Percent Defoliation, 500 p.p.m. After 7 Days, Based on Tributyl Phosphorotrithioite |
|---|---|---|
| P(SR)₃, Formula (1) | $P[SCH_2CH(CH_3)_2]_3$ | 26.4 |
| | $P(SC_3H_7)_2(SC_4H_9)_2$ | 124.2 |
| (RO)₂PSR, Formula (2) | $(ClCH_2CH_2O)_2PSC_4H_9$ | 43.6 |
| | $(C_2H_5O)_2PSC_4H_9$ | 25.4 |
| | $HOP(SC_4H_9)_2$ | 64.3 |
| | $CH_3OP(SC_4H_9)_2$ | 33.4 |
| | $ClCH_2CH_2OP(SC_3H_7)_2$ | 57.1 |
| | $C_2H_5OP(SC_4H_9)_2$ | 43.6 |
| ROP(SR)₂, Formula (3) | $ClCH_2CH_2OP(SC_4H_9)_2$ | 42.8 |
| | $C_3H_7OP(SC_4H_9)_2$ | 92.9 |
| | $ClC_3H_6OP(SC_4H_9)_2$ | 74.6 |
| | $CH_3CH_2CH(CH_3)OP(SC_4H_9)_2$ | 73.4 |
| | $(CH_3)_2CHCH_2OP(SC_4H_9)_2$ | 44.5 |
| P(SAr)₃, Formula (4) | $P(SC_6H_4CH_3)_3$ | 65.7 |
| (ArO)₂PSR, Formula (5) | $(C_6H_5O)_2PSC_4H_9$ | 34.1 |
| | $C_6H_5OP(SC_3H_7)_2$ | 85.1 |
| | $C_6H_5OP(SC_4H_9)_2$ | 119.8 |
| | $C_6H_5OP(SC_3H_7)(SC_4H_9)$ | 76.9 |
| | $Cl_5C_6OP(SC_4H_9)_2$ | 31.0 |
| | $p\text{-}ClC_6H_4OP(SC_3H_7)_2$ | 32.0 |
| | $p\text{-}ClC_6H_4OP(SC_4H_9)_2$ | 56.4 |
| | $2,4,5\text{-}Cl_3C_6H_2OP(SC_3H_7)_2$ | 28.9 |
| | $p\text{-}NO_2C_6H_4OP(SC_4H_9)_2$ | 91.4 |
| | $o\text{-}CH_3C_6H_4OP(SC_4H_9)_2$ | 27.3 |
| | $m\text{-}CH_3C_6H_4OP(SC_4H_9)_2$ | 153.9 |
| ArOP(SR)₂, Formula (6) | $p\text{-}CH_3C_6H_4OP(SC_4H_9)_2$ | 29.8 |
| | $o\text{-}CH_3C_6H_4OP(SC_3H_7)(SC_4H_9)$ | 81.5 |
| | $m\text{-}CH_3C_6H_4OP(SC_3H_7)(SC_4H_9)$ | 151.2 |
| | $p\text{-}CH_3C_6H_4OP(SC_3H_7)(SC_4H_9)$ | 92.4 |
| | $2,6\text{-}(CH_3CHCH_3)_2C_6H_3OP(SC_4H_9)_2$ | 74.3 |
| | $p\text{-}(CH_3)_3CC_6H_4OP(SC_4H_9)_2$ | 100.0 |
| | $C_6H_5C_6H_4OP(SC_3H_7)_2$ | 22.3 |
| | $C_6H_5C_6H_4OP(SC_4H_9)_2$ | 20.0 |
| | $C_6H_5CP(SC_4H_9)_2$ | 74.1 |
| ArSP(SR)₂, Formula (7) | $CH_3C_6H_4SP(SC_4H_9)_2$ | 80.0 |
| | $CH_3CH_3C_6H_3SP(SC_4H_9)_2$ | 114.2 |

The compounds showing the best activity in the screening test were retested at higher concentrations in the greenhouse spray test, and the results are reported in Table III. As in Tables I and II, the data in Table III is based on the activity of tributyl phosphorotrithioite.

positions in this manner has enhanced the defoliating effectiveness of the prior art compositions. It would be impractical to list here all of the possible combinations of my phosphorothioites with known defoliants, but such compositions should be considered within the scope of my invention.

TABLE III.—GREENHOUSE SPRAY TEST—RETEST RESULTS

| Generic Formula | Structural Formula | Percent Defoliation After 7 Days, Based on Tributyl Phosphorotrithioite | | | | | |
|---|---|---|---|---|---|---|---|
| | | 500 p.p.m. | 1,000 p.p.m. | 1,250 p.p.m. | 2,000 p.p.m. | 2,500 p.p.m. | 5,000 p.p.m. |
| P(SR)₃, Formula (1) | P(SCH₃)₃ | | | | 5.4 | | 5.0 |
| | P(SC₂H₅)₃ | | | 5.4 | | 34.8 | 70.0 |
| | P(SC₃H₇)₃ | [1] 37.2 | [2] 50.0 | 73.4 | | 83.1 | 78.0 |
| | P(SC₅H₁₁)₃ | [1] 93.0 | [2] 100.0 | 74.4 | | 80.0 | 76.0 |
| | P(SC₆H₁₃)₃ | | | | | | 10.0 |
| | P[SCH₂CH(CH₃)₂]₂ | | | 102.2 | | 89.3 | 84.1 |
| | P(SC₃H₇)(SC₄H₉)₂ | 75.6 | 139.7 | | 114.9 | | |
| (RO)₂PSR, Formula (2) | (ClCH₂CH₂O)₂PSC₄H₉ | 138.0 | 58.4 | 109.2 | 61.4 | 96.8 | 125.8 |
| | Mixture: 9 parts (ClCH₂CH₂O)₂PSC₄H₉ 1 part P(SC₄H₉)₃ | } 87.0 | 69.5 | 100.3 | 93.3 | 156.6 | 86.5 |
| ROP(SR)₂, Formula (3) | HOP(SC₄H₉)₂ | 69.1 | 107.1 | | 120.1 | | |
| | C₃H₇OP(SC₄H₉)₂ | | | 64.0 | | 62.6 | 67.7 |
| | C₆H₅OP(SC₃H₇)₂ | 44.8 | 48.1 | 90.5 | 61.4 | 172.5 | 186.0 |
| | C₆H₅OP(SC₄H₉)₂ | 74.5 | 96.0 | 137.3 | 113.0 | 185.5 | 111.1 |
| ArOP(SR)₂, Formula (6) | m-CH₃C₆H₄OP(SC₄H₉)₂ | 166.5 | 120.2 | | 61.5 | | |
| | p-CH₃C₆H₄OP(SC₄H₉)₂ | | | 66.1 | | 113.0 | 120.9 |
| | m-CH₃C₆H₄OP(SC₃H₇)(SC₄H₉) | 102.2 | 153.1 | | 119.3 | | |
| | p-CH₃C₆H₄OP(SC₃H₇)(SC₄H₉) | 83.5 | 67.6 | | 102.0 | | |
| | p-(CH₃)₃CC₆H₄OP(SC₄H₉)₂ | 120.3 | 78.6 | 91.6 | 51.1 | 178.2 | 125.1 |
| ArSP(SR)₂, Formula (7) | CH₃CH₃C₆H₃SP(SC₄H₉)₂ | 59.5 | 131.1 | | 110.8 | | |

[1] Tested at 312 p.p.m.
[2] Tested at 625 p.p.m.

In the foregoing tables, my compounds were used alone, or, in one instance, two were mixed together and tested. However, these phosphorothioites may also be used in conjunction with other defoliant compositions of the prior art, such as aminotriazole, as shown in Table IV. In some applications the use of my com- Example IV, below, describes the field tests of two of my compounds on cotton, and summarizes the results obtained. One of the compounds is tributyl phosphorotrithioite, which was used as a control in Tables I, II, and III.

EXAMPLE IV

*Field tests of tripropyl phosphorotrithioite and tributyl phosphorotrithioite, Formula 1*

Emulsifiable concentrates were prepared containing 75% trialkyl phosphorotrithioite, 15% kerosene, and 10% Atlox 3396 emulsifier. Atlox 3396 is similar to Atlox 3335 described previously. The solutions were diluted with water, the amount depending on the maturity and density of the cotton and whether the materials were to be applied from the ground or from the air. The following table shows the percent defoliation at different application rates of the two compounds in seven states when the above emulsions were applied to field-grown mature cotton plants.

TABLE IV.—MIXTURES OF TRIPROPYL PHOSPHOROTRITHIOITE, FORMULA 1, AND AMINOTRIAZOLE

| Tripropyl Phosphorotrithioite, lbs./acre | Aminotriazole, lbs./acre | Percent Defoliation [1] | |
|---|---|---|---|
| | | 5-6 Days | 10-15 Days |
| 1.25 | 0.75 | 78 | 83 |
| 2.00 | 0.75 | 85 | 88 |
| 2.50 | 0.75 | 88 | 90 |
| 1.75 | 1.00 | 90 | 90 |
| 2.50 | 1.00 | 85 | 95 |
| 2.50 | 0 | 70 | 90 |

[1] Average of three replicates.

TABLE V.—FIELD TEST RESULTS OF TRIPROPYL PHOSPHOROTRITHIOITE AND TRIBUTYL PHOSPHOROTRITHIOITE

| State | Days After Application | Concentration, lbs./acre | | | | | | | | | | | | | |
|---|---|---|---|---|---|---|---|---|---|---|---|---|---|---|---|
| | | 1.0 | | 1.5 | | 2.0 | | 2.5 | | 3.0 | | 4.0 | | 6.0 | |
| | | Tripropyl | Tributyl | Tripropyl | Tributyl | Tripropyl | Tributyl | Tripropyl | Tributyl | Tripropyl | Tributyl | Tripropyl | Tributyl | Tripropyl | Tributyl |
| Arizona, percent defoliation | 6 | 80 | 80 | | | | | | | | | 90 | 85 | | |
| Do | 13 | 85 | 90 | | | | | | | | | 95 | 95 | | |
| California, percent defoliation | varied | | | | | 85-90 | | | | | | | 85-95 | | 90-95 |
| Louisiana, percent defoliation | 6 | 71 | 86 | | | 76 | 76 | | | 76 | | | | | |
| Do | 12 | 69 | 83 | | | 80 | 83 | | | 86 | | | | | |
| Mississippi, percent defoliation | 5 | | 75-80 | | | | | | | | | | | | |
| Do | 6 | | 85 | | | 85-90 | 80-85 | | | | | | | | |
| Do | 7 | | 85 | | 93 | | 88 | | | | | | | | |
| Do | 10 | | | | | 90-95 | | | | | | | | | |
| Oklahoma, percent defoliation | 7 | | 79 | | | | 84 | | | | | 80 | | | |
| South Carolina, percent defoliation | 7 | 90 | 88 | | | | | 92 | 90 | | | | | | |
| Texas, percent defoliation | 8 | 53 | 26 | 86-90 | 92-97 | 88-93 | 91-94 | 97 | 97 | | | | | | |

In the field, 75% defoliation is normally considered good and about 85% is excellent. The data in Table V readily shows that my compounds yield essentially uniform defoliation in many of the climatic conditions found across the cotton belt. This is an important advantage of my invention over the compositions of the prior art.

It is apparent from Tables I, II, and III that all of my compounds exhibit at least some degree of defoliation activity. Even those compounds which show low activity in the cotyledon test, based on a known defoliant, would be successful in the field if applied at sufficient concentrations.

The same reasoning is applicable in considering the activity of the phosphorothioite compounds of my invention on other plants. Data is given in Examples V, VI, and VII, following, on the defoliation activity of tributyl phosphorotrithioite on other plants, and it is obvious from the results obtained on cotton that any of my compounds would show comparable activity on these other plants.

Example V describes the field test on one variety of roses. Actually, 90 varieties were tested, and very good overall defoliation activity was obtained. The varieties tested are as follows:

Spectacular
Climbing Showgirl
Cecile Brunner
The Doctor
Rosenelf
Circus
Carousel
Helen Traubel
Eclipse
Mirandy
Capistrano
First Love
Countess Vandal
Forty Niner
Chief Seattle
Fred Howard
Jiminy Cricket
Etoile d'Hollande
Picture
Dianty Bess
La Jolla
Betty Prior
Frensham
Red Pinocchio
Valentine
Crimson Glory
New Yorker
Spartan
Red Jacket
R. M. Finch
Climbing Crimson Glory
Queen Elizabeth
Pres. H. Hoover
Golden Charm
Radiance
Irene of Denmark
Fiesta
Madam Henri Guillot
Talisman
Tally Ho
Sutter's Gold
Mission Belle
Midnight
Soeur Therese
Aztec
Pinky China Doll
White Knight
Starlet
Greenfire
Ruby Lips
Duet
Forward March
Isobel Harkness
Second Love
Pink Peace
Pocahontas
Last Chance
Frau Karl Druschki
K. T. Marshall
Roundelay
Tiffany
Floradora
Briarcliff
Louis Philippe
County Fair
Coral Queen
Dessan Gold
Double Take
Tall Cerise
Dark First Love
Heat Wave
Happiness
Golden Rapture No. 5
Pink Rapture
Stoplight
Pink Champagne
Better Times
Snow White
Baccara
Pink Sensation
Talisman No. 5
Pink Bountiful
Garnette
Yuletide
White Butterfly
Crimson Rosette
Gold Strike
Peace
Folkstone

EXAMPLE V

*Field tests of tributyl phosphorotrithioite, Formula 1, on roses*

An emulsifiable concentrate was prepared containing 87% tributyl phosphorotrithioite, and the remainder oil and emulsifier. One gallon of this solution contained 7.6 lbs. of active ingredient. The solution was diluted with water to give emulsions containing ¾%, 1½%, and 3% by volume of tributyl phosphorotrithioite. These emulsions were sprayed on two-year old rose plants at the rate of approximately 150 gallons per acre. At all concentrations, one hundred percent defoliation was realized on the Queen Elizabeth variety after approximately two weeks.

EXAMPLE VI

*Defoliation activity of tributyl phosphorotrithioite, Formula 1, on hydrangeas*

An emulsifiable concentrate was prepared containing 75% tributyl phosphorotrithioite, and the remainder oil and emulsifier. The solution was diluted with water to give emulsions containing 1.0%, 1.5%, and 2.0% by volume of tributyl phosphorotrithioite. These emulsions were sprayed on the Hamburg and Europa varieties of hydrangea, and 95–99% defoliation was noted after eight days.

EXAMPLE VII

*Defoliation activity of tributyl phosphorotrithioite, Formula 1, on trees*

An emulsifiable concentrate, prepared as in Example V, and containing 7.6 lbs. of tributyl phosphorotrithioite per gallon, was diluted with water to give emulsions containing ½%, 1%, and 2% by volume of the active ingredient. These emulsions were sprayed on Siberian elm, pear, sand cherry, and ash trees, and results were taken nine days after treatment.

| Concentration | Percent Defoliation | | | |
|---|---|---|---|---|
| | Siberian Elm | Pear | Sand Cherry | Ash |
| ½% | 31.5 | 58.1 | 1.3 | |
| 1% | 22.9 | 54.5 | 5.7 | |
| 2% | 71.6 | 96.6 | 11.7 | 37.5 |

Similar tests were performed on plum and peach trees, and good defoliation results were obtained at concentrations of ¾% by volume of tributyl phosphorotrithioite.

The results in Examples V, VI, and VII indicate that my compounds would be useful on any plants which defoliate naturally or which are normally artificially defoliated.

I claim:

1. A method of defoliating living plants having an annual leaf-drop, which comprises applying to the leaves thereof in an amount sufficient to effect defoliation, a phosphorothioite corresponding to the formula

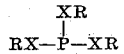

wherein X is a member selected from the group consisting of oxygen and sulfur atoms, at least one of the members X being a sulfur atom and R is a member selected from the group consisting of hydrogen, lower alkyl, benzyl, phenyl, biphenylyl, nitro-substituted phenyl, and alkyl-substituted phenyl wherein said alkyl contains from 1 to 8 carbon atoms.

2. A method of defoliating living plants having an annual leaf-drop, which comprises applying to the leaves thereof in an amount sufficient to effect defoliation, a trialkyl phosphorotrithioite wherein the alkyl groups are lower alkyl.

3. A method of defoliating living plants having an annual leaf-drop, which comprises applying to the leaves thereof in an amount sufficient to effect defoliation, tributyl phosphorotrithioite.

4. A method of defoliating cotton, which comprises applying thereto when the plant contains bolls, in an amount sufficient to effect defoliation, a phosphorothioite corresponding to the formula

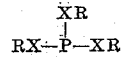

wherein X is a member selected from the group consisting of oxygen and sulfur atoms, at least one of the members X being a sulfur atom and R is a member selected from the group consisting of hydrogen, lower alkyl, benzyl, phenyl, biphenylyl, nitro-substituted phenyl, and alkyl-substituted phenyl wherein said alkyl contains from 1 to 8 carbon atoms.

5. A method of defoliating cotton which comprises applying thereto when the plant contains bolls, in an amount sufficient to effect defoliation, a trialkyl phosphorotrithioite wherein the alkyl groups are lower alkyl.

6. The method of defoliating cotton which comprises applying thereto when the plant contains bolls, in an amount effective to defoliate the cotton, tributyl phosphorotrithioite.

7. The method of defoliating cotton which comprises applying thereto when the plant contains bolls, in an amount effective to defoliate the cotton, propyl dibutyl phosphorotrithioite.

8. The method of defoliating cotton which comprises applying thereto when the plant contains bolls, in an amount effective to defoliate the cotton, S, S dibutyl phosphorodithioite.

9. The method of defoliating cotton which comprises applying thereto when the plant contains bolls, in an amount effective to defoliate the cotton, S-propyl S-butyl O-methylphenyl phosphorodithioite.

10. The method of defoliating cotton which comprises applying thereto when the plant contains bolls, in an amount effective to defoliate the cotton, dibutyl dimethylphenyl phosphorotrithioite.

No references cited.